US012220955B2

(12) United States Patent  
Fournier et al.

(10) Patent No.: US 12,220,955 B2  
(45) Date of Patent: Feb. 11, 2025

(54) TIRE HAVING A CROWN REINFORCEMENT MADE UP OF TWO WORKING CROWN LAYERS AND OPTIMIZED SIDEWALLS

(71) Applicant: COMPAGNIE GENERALE DES ETABLISSEMENTS MICHELIN, Clermont-Ferrand (FR)

(72) Inventors: Orel Fournier, Clermont-Ferrand (FR); Sébastien Noel, Clermont-Ferrand (FR); Maxime Rolland, Clermont-Ferrand (FR); Jean-Luc Guerbert-Jubert, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 464 days.

(21) Appl. No.: 17/616,038

(22) PCT Filed: Jun. 4, 2020

(86) PCT No.: PCT/EP2020/065415  
§ 371 (c)(1),  
(2) Date: Dec. 2, 2021

(87) PCT Pub. No.: WO2020/245239  
PCT Pub. Date: Dec. 10, 2020

(65) Prior Publication Data  
US 2022/0324259 A1    Oct. 13, 2022

(30) Foreign Application Priority Data  
Jun. 6, 2019 (FR) ........................ 1906035

(51) Int. Cl.  
*B60C 9/20* (2006.01)  
*B60C 15/00* (2006.01)  
*B60C 15/06* (2006.01)

(52) U.S. Cl.  
CPC ............ *B60C 9/20* (2013.01); *B60C 15/0009* (2013.01); *B60C 15/0628* (2013.01);  
(Continued)

(58) Field of Classification Search  
CPC ........ B60C 2200/06; B60C 2009/2016; B60C 15/024; B60C 9/20; B60C 2009/2048;  
(Continued)

(56) References Cited  
U.S. PATENT DOCUMENTS  
4,408,648 A   10/1983  Ohashi  
2006/0000199 A1   1/2006  Domingo et al.  
(Continued)

FOREIGN PATENT DOCUMENTS  
FR   2 728 510   12/1994  
FR   2 779 387   12/1999  
(Continued)

OTHER PUBLICATIONS  
Fournier et al., WO2017149221. 2017. Machine translated via ESpaceNet (Year: 2024).*  
(Continued)

*Primary Examiner* — Katelyn W Smith  
*Assistant Examiner* — Alexander D Booth  
(74) *Attorney, Agent, or Firm* — COZEN O'CONNOR

(57) ABSTRACT

A tire having a radial carcass reinforcement, made up of a single layer of reinforcing elements anchored in each of the beads by being turned up around a bead wire, reinforced by a stiffener. The two working crown layers are the only ones present to form the crown reinforcement over at least 75% of the width of the tread, the absolute value of the difference between the absolute values of the angles α2 and α1 being greater than 8°, α2 being greater than α1 in terms of absolute value, the mean angle α satisfying the relationship $13+131*\exp(-L/100)<\alpha<20+164*\exp(-L/100)$, the rein-  
(Continued)

forcing elements of the carcass reinforcement being cords which, in the test referred to as the permeability test, yield a flow rate of less than 20 cm³/min, a rubber compound being present within the cords, and, in the sidewall of the tire, the profile of the outer surface of the tire is at a constant distance from the carcass reinforcement layer between the points F and A, and meets the outer surface of the bead at the point C, forming two successive circular arcs.

14 Claims, 3 Drawing Sheets

(52) U.S. Cl.
CPC ............... *B60C 2009/2016* (2013.01); *B60C 2009/2019* (2013.01); *B60C 2009/2048* (2013.01); *B60C 2009/2093* (2013.01)

(58) Field of Classification Search
CPC ............ B60C 2015/065; B60C 13/003; B60C 15/0628; B60C 2015/0621; B60C 15/0607; B60C 15/0009
See application file for complete search history.

(56) References Cited

U.S. PATENT DOCUMENTS

| | | | |
|---|---|---|---|
| 2013/0340913 A1* | 12/2013 | Sallaz | B60C 15/06 152/552 |
| 2015/0000816 A1* | 1/2015 | Caffeau | D07B 1/062 152/527 |
| 2015/0352908 A1* | 12/2015 | Osaki | B60C 15/0009 152/539 |
| 2020/0361242 A1* | 11/2020 | Salgues | B60C 9/2006 |
| 2021/0268847 A1* | 9/2021 | Barton | B60C 15/0009 |

FOREIGN PATENT DOCUMENTS

| | | | |
|---|---|---|---|
| FR | 2 984 221 | 6/2013 | |
| JP | H 03213409 | 9/1991 | |
| WO | WO 99/24269 | 5/1999 | |
| WO | WO 2017/149222 | 9/2017 | |
| WO | WO-2017149221 A1 * | 9/2017 | ............... B60C 3/04 |
| WO | WO 2019/058075 | 3/2019 | |
| WO | WO-2020012122 A1 * | 1/2020 | ........... B60C 13/003 |
| WO | WO-2020200923 A1 * | 10/2020 | ........... B60C 9/0007 |

OTHER PUBLICATIONS

Fournier et al., WO2020200923. 2020. Machine translated via ESpaceNet. (Year: 2024).*

* cited by examiner

TIRE HAVING A CROWN REINFORCEMENT MADE UP OF TWO WORKING CROWN LAYERS AND OPTIMIZED SIDEWALLS

RELATED APPLICATIONS

This is a U.S. National Phase Application under 35 USC 371 of International Application PCT/EP2020/065415 filed on Jun. 4, 2020.

This application claims the priority of French application no. FR 1906035 filed Jun. 6, 2019, the entire content of all of which is hereby incorporated by reference.

FIELD OF THE INVENTION

The present invention relates to a tire having a radial carcass reinforcement, and more particularly to a tire intended to equip vehicles that carry heavy loads and run at a sustained speed, such as lorries, tractors, trailers or buses, for example.

BACKGROUND OF THE INVENTION

In tires of heavy-duty type, the carcass reinforcement is generally anchored on either side in the region of the bead and is surmounted radially by a crown reinforcement made up of at least two layers that are superimposed and formed of threads or cords that are parallel in each layer and crossed from one layer to the next, making angles of between 10° and 45° with the circumferential direction. Said working layers that form the working reinforcement may also be covered with at least one layer, referred to as protective layer, formed of reinforcing elements that are advantageously metal and extensible and are referred to as elastic reinforcing elements. The crown reinforcement may also comprise a layer of metal threads or cords of low extensibility that make an angle of between 45° and 90° with the circumferential direction, this ply, referred to as the triangulation ply, being situated radially between the carcass reinforcement and the first crown ply, referred to as the working ply, which are formed of parallel threads or cords that exhibit angles at most equal to 45° in terms of absolute value. The triangulation ply forms, with at least said working ply, a triangulated reinforcement that exhibits little deformation under the various stresses to which it is subjected, the triangulation ply essentially serving to absorb the transverse compressive forces that act on all the reinforcing elements in the crown region of the tire.

Cords are said to be inextensible when said cords exhibit, under a tensile force equal to 10% of the breaking force, a relative elongation at most equal to 0.2%.

Cords are said to be elastic when said cords exhibit, under a tensile force equal to the breaking load, a relative elongation at least equal to 3% with a maximum tangent modulus of less than 150 GPa.

Circumferential reinforcing elements are reinforcing elements that make with the circumferential direction angles in the range +2.5°, −2.5° around 0°.

The circumferential direction of the tire, or longitudinal direction, is the direction that corresponds to the periphery of the tire and is defined by the direction of running of the tire.

The transverse or axial direction of the tire is parallel to the axis of rotation of the tire.

The radial direction is a direction that intersects the axis of rotation of the tire and is perpendicular thereto.

The axis of rotation of the tire is the axis about which it turns in normal use.

A radial or meridian plane is a plane that contains the axis of rotation of the tire.

The circumferential median plane, or equatorial plane, is a plane that is perpendicular to the axis of rotation of the tire and divides the tire into two halves.

For metal threads or cords, force at break (maximum load in N), breaking strength (in MPa), elongation at break (total elongation in %) and modulus (in GPa) are measured under tension in accordance with the standard ISO 6892 of 1984.

Such tires also usually have, at the beads, one or more layers of reinforcing elements referred to as stiffeners. These layers are usually made up of reinforcing elements that are oriented at an angle of less than 45°, and usually less than 25°, with respect to the circumferential direction. These layers of reinforcing elements have in particular the role of limiting the longitudinal displacements of the materials that make up the bead with respect to the rim of the wheel in order to limit premature wearing of said bead. They also make it possible to limit the permanent deformation of the bead on the rim flange, caused by the phenomenon of dynamic creep of the elastomer materials. This deformation of the bead, when excessive, may prevent the retreading of the tires. They also help to protect the lower regions of the tire from the stresses to which the tires are subjected when they are being mounted on and removed from the rims.

Furthermore, in cases where the carcass reinforcement is anchored around a bead wire, which anchoring consists in at least partly winding the carcass reinforcement around a bead wire in each of the beads, forming a turn-up that extends to a greater or lesser height in the sidewall, the layers of reinforcing elements or stiffener layers also make it possible to prevent or delay the unwinding of the carcass reinforcement during accidental and excessive increases in rim temperature.

These layers of reinforcing elements or stiffeners are usually positioned axially on the outside of the turn-up of the carcass reinforcement and extend in the sidewall to a height greater than that of the turn-up in particular in order to cover the free ends of the reinforcing elements of said turn-up.

Such designs of tires are described for example in documents FR 2779387 and US 2006/0000199.

The presence of these layers of reinforcing elements or stiffeners helps to thicken the region of the bead as far as the bottom of the region of the sidewall in the direction of the region of the tire in which the latter has its greatest axial width. This profile of the tire appears to bring about weaknesses in the tire with respect to certain types of impact, in particular when the tire comes into contact with kerbs.

Furthermore, certain present-day tires, referred to as "road tires", are intended to run at high average speeds and over increasingly long journeys, because of improvements to the road network and the growth of motorway networks worldwide. The combined conditions under which such a tire is called upon to run undoubtedly make it possible to increase the distance covered, since tire wear is lower. This increase in life in terms of distance covered, combined with the fact that such conditions of use are likely, under heavy load, to result in relatively high crown temperatures, dictates the need for an at least proportional increase in the durability of the crown reinforcement of the tires.

This is because there are stresses in the crown reinforcement and, more particularly, shear stresses between the crown layers which, in the case of an excessive rise in the operating temperature at the ends of the axially shortest crown layer, result in the appearance and propagation of cracks in the rubber at said ends. The same problem exists in the case of edges of two layers of reinforcing elements, said layers not necessarily being radially adjacent to one another.

In order to improve the endurance of the crown reinforcement of the tires, French application FR 2 728 510 proposes arranging, on the one hand, between the carcass reinforcement and the crown reinforcement working ply that is radially closest to the axis of rotation, an axially continuous ply which is formed of inextensible metal cords that form an angle at least equal to 60° with the circumferential direction and of which the axial width is at least equal to the axial width of the shortest working crown ply and, on the other hand, between the two working crown plies, an additional ply formed of metal elements that are oriented substantially parallel to the circumferential direction.

In addition, French application WO 99/24269 notably proposes, on each side of the equatorial plane and in the immediate axial continuation of the additional ply of reinforcing elements substantially parallel to the circumferential direction, that the two working crown plies formed of reinforcing elements crossed from one ply to the next be coupled over a certain axial distance and then uncoupled using profiled elements of rubber compound over at least the remainder of the width that said two working plies have in common.

Furthermore, the use of tires on heavy duty vehicles of the "worksite supply" type means that the tires are subjected to shock loadings when running over stony ground. These shock loadings are of course detrimental with regard to performance in terms of endurance.

It is also known practice for a person skilled in the art to increase the number of plies of which the crown reinforcement is made in order to improve the endurance of the tire with respect to such shock loadings.

Whatever the solution is envisaged from among the solutions presented above, the presence of one or more layers of additional reinforcing elements leads to a greater mass of the tire and to higher tire manufacturing costs.

Also known, from document WO 2017/149222, is a tire for which the crown reinforcement is lightened while improving the endurance of the tire with respect to such shocks. However, the inventors have found that when running on ground that severely stresses the tires, the endurance performance of such tires can be degraded, for example under particularly harsh running conditions that combine vehicle speed, the load borne by the tire and the nature of the ground. Indeed it is possible to observe a degradation in the endurance performance for example when running at a relatively high speed over ground of the worksite supply type that is very harsh on the tire.

SUMMARY OF THE INVENTION

The inventors have thus set themselves the task of providing tires for "heavy duty" vehicles, for example of the "worksite supply" type, of which the overall mass is limited and of which at the same time the endurance performance of the bead regions is maintained, with a reduction in the damage sustained when the tire comes into contact with a kerb, and the endurance with respect to shock loadings experienced by the tread is improved, regardless of the nature of the ground and of the running conditions.

This objective has been achieved according to an embodiment of the invention by a tire intended to be fitted on a drop-center rim of the "15° drop-center" type, comprising a radial carcass reinforcement made up of a single carcass reinforcement layer formed of reinforcing elements, said tire comprising a crown reinforcement, comprising two working crown layers of reinforcing elements that are crossed from one layer to the other, making with the circumferential direction angles ($\alpha 1$, $\alpha 2$) of between 8° and 45°, said angles $\alpha 1$ and $\alpha 2$ being oriented on either side of the circumferential direction, the crown reinforcement being radially capped by a tread, said tread being connected to two beads via two sidewalls, the layer of reinforcing elements of the carcass reinforcement being anchored in each of the beads by being turned up around a bead wire to form a main part of the carcass reinforcement layer extending from one bead wire to the other, and a turn-up of the carcass reinforcement layer in each of the beads, said turn-up of the carcass reinforcement being reinforced by at least one layer of reinforcing elements or a stiffener, said two working crown layers being the only ones present to form the crown reinforcement over at least 75% of the axial width of the crown reinforcement, the reinforcing elements of the radially outermost working layer forming an angle $\alpha 2$ with the circumferential direction which is greater in terms of absolute value than the angle $\alpha 1$ formed by the reinforcing elements of the radially innermost working layer with the circumferential direction, the absolute value of the difference between the absolute values of the angles $\alpha 2$ and $\alpha 1$ being greater than 8°, the mean angle $\alpha$ satisfying the relationship:

$$13+131*\exp(-L/100)<\alpha<20+164*\exp(-L/100),$$

$\alpha$ being defined by the relationship $\alpha=\mathrm{Arctan}((\tan(|\alpha 1|)*\tan(|\alpha 2|))^{1/2})$, L being the maximum width of the tire measured in the axial direction and expressed in mm, the metal reinforcing elements of said carcass reinforcement layer being cords, preferably non-wrapped cords that, in the test referred to as the permeability test yield a flow rate of less than 20 $cm^3$/min, a rubber compound being present at least locally within the structure of said cords, and, in a meridian section of said tire any point of the profile of the outer surface S of the tire, between a first point F, itself defined by the intersection of an axially oriented straight line, passing through the axially outermost point E of the main part of the carcass reinforcement layer and the outer surface S of the tire, and a point A, is at a constant distance T from the main part of the carcass reinforcement layer, said distance being measured at any point in a direction normal to the main part of the carcass reinforcement layer, the point A is radially on the outside of a first circle C1 of radius R1 that is centered on the end of the turn-up of the carcass reinforcement layer, R1 being between 8 and 13 mm, radially on the inside of the point A, the outer surface S of the tire extends by an arc of a circle of radius R2, the center of which is axially on the outside of the surface S of the tire, the circular arc of radius R2 is tangential at its radially innermost end B to a circular arc of radius R3, the center of which is axially on the inside of the surface S of the tire, and continues the outer surface S of the tire radially inwards as far as the point C, said point C being a point of tangency between the circular arc of radius R3 and the circle C2 of radius R1 centered on the radially outermost end of the stiffener, said point C being radially on the inside of the axially outermost point D of the circle C2.

Within the meaning of the invention, a drop-center rim (15° drop center) or safety-hump drop-center rim is a one-piece rim, as defined in the ETRTO, of which the seats that are intended to receive the beads of the tire have a frustoconical shape, the angle formed with the axial direction being substantially equivalent to 15°. These seats are also extended by rim flanges of reduced height compared with flanges of flat-base rims, the rim seats of which have substantially cylindrical shapes.

The width L is measured on a tire mounted on its nominal rim and inflated to its nominal pressure, according to the ETRTO, and is expressed in millimetres.

The angles $\alpha 1$ and $\alpha 2$, expressed in degrees, are measured on a cross section of the tire. According to the invention, angles are measured at the circumferential median plane.

The meridian cross section of the tire is defined in accordance with the invention such that the centers of mass of the bead wires form an axially oriented straight line, said centers of mass being at a distance from each other by a distance equal to the width of the nominal rim J increased by 20 mm and decreased by twice the distance measured axially between a center of mass of a bead wire and a point on the outer surface of the tire.

The position of the axially outermost point of the main part of the carcass reinforcement is determined on a mounted tire inflated under nominal conditions. This determination can be carried out for example using a tomographic technique.

The distance T is measured along the normal to the main part of the carcass reinforcement layer between the axially outermost point of a reinforcement of the carcass reinforcement layer and a point of said surface S.

Within the meaning of the invention, a constant distance T means that the distance T does not vary by more than 0.5 mm. The variations in thickness are then caused only by phenomena of creep during the manufacturing and curing of the tire.

The test referred to as the permeability test makes it possible to determine the longitudinal permeability of the cords tested to air, by measuring the volume of air passing along a test specimen under constant pressure over a given period of time. The principle of such a test, which is well known to a person skilled in the art, is to demonstrate the effectiveness of the treatment of a cord to make it impermeable to air; it has been described for example in the standard ASTM D2692-98.

The test is carried out on cords extracted directly, by stripping, from the vulcanized rubber plies which they reinforce, thus penetrated by the cured rubber. According to the invention, the part of the cord that is tested is situated in the region of the bead of the tire radially on the outside of the bead wire.

The test is carried out on a 2 cm length of cord, which is therefore coated with its surrounding rubber compound (or coating rubber) in the cured state, in the following way: air is injected into the inlet end of the cord at a pressure of 1 bar and the volume of air at the outlet end is measured using a flow meter (calibrated for example from 0 to 500 $cm^3/min$). During the measurement, the sample of cord is immobilized in a compressed airtight seal (for example, a seal made of dense foam or of rubber) so that only the amount of air passing along the cord from one end to the other, along its longitudinal axis, is taken into account by the measurement; the airtightness of the airtight seal itself is checked beforehand using a solid rubber test specimen, that is to say one without a cord.

The lower the mean air flow rate measured (mean over 10 test specimens), the higher the longitudinal impermeability of the cord. Since the measurement is carried out with an accuracy of $\pm 0.2$ $cm^3/min$, measured values of less than or equal to 0.2 $cm^3/min$ are regarded as zero; they correspond to a cord which can be described as airtight (completely airtight) along its axis (i.e. in its longitudinal direction).

This permeability test also constitutes a simple means of indirect measurement of the degree of penetration of the cord by a rubber composition. The lower the flow rate measured, the greater the degree of penetration of the cord by the rubber.

The degree of penetration of a cord can also be estimated according to the method described below. In the case of a layered cord, the method consists, in a first step, in removing the outer layer from a sample with a length of between 2 and 4 cm in order to subsequently measure, in a longitudinal direction and along a given axis, the sum of the lengths of rubber compound in relation to the length of the sample. These measurements of lengths of rubber compound exclude the spaces not penetrated along this longitudinal axis. These measurements are repeated along three longitudinal axes distributed over the periphery of the sample and are repeated on five samples of cord.

When the cord comprises several layers, the first step of removal is repeated with what is now the outer layer and the measurements of lengths of rubber compound along longitudinal axes.

A mean of all the ratios of lengths of rubber compound to the lengths of samples thus determined is then calculated in order to define the degree of penetration of the cord.

Also advantageously, the tire according to the invention is intended to be inflated to an inflation pressure P greater than or equal to 6.5 bar.

Preferably according to the invention, the reinforcing elements of said two working crown layers are made of metal.

According to an advantageous variant embodiment of the invention, the radius R2 is between 50% and 125% of the distance between the point F and the center of gravity of the bead wire.

Advantageously also according to the invention, the radius R3 is between 50% and 125% of the distance between the point F and the center of gravity of the bead wire.

The center of gravity of the bead wire is determined on a meridian cross section of the tire.

According to a preferred embodiment of the invention, the radius R2 is greater than 1.5 times the radius R1 and preferably less than 8 times the radius R1.

Advantageously according to the invention, the distance T, measured in a direction normal to the main part of the carcass reinforcement layer, is greater than 3 mm and preferably less than 7 mm.

The results obtained with tires according to the invention have effectively demonstrated that performance in terms of endurance can be improved notably when running over stony ground, with the crown reinforcement of the tire lightened. The lightening of the crown reinforcement of the tire is accompanied by a simplification of the manufacturing process and by a reduction in manufacturing costs.

Against all expectations, the results effectively showed that the tires according to the invention can be lightened by reducing the number of layers that make up the crown reinforcement while at the same time maintaining or even improving the endurance properties of the crown of the tire notably with regard to the shock loadings to which the tread is subjected.

Specifically, a person skilled in the art knows that, in order to improve the endurance performance of the crown reinforcement of a tire with regard to this type of shock loadings, it is usual practice to increase the number of layers of reinforcing elements.

The inventors believe that these results can be interpreted by the fact that the angle formed with the circumferential direction by the reinforcing elements of the radially innermost working crown layer is an angle which is smaller in terms of absolute value than the angle formed by the reinforcing elements of the radially outermost working crown layer. They found that this smaller angle appears to lead to a delay in the absorption of tension by the reinforcing elements in the event of such a shock loading. Usually, in the event of shock loadings comparable with those observed when running over stony ground, the breakage of reinforcing elements, if such breakage occurs, is found in the radially innermost layer. These observations appear to indicate that, in the face of this type of attack, the difference in angle of the reinforcing elements between the two working crown layers makes it possible to improve the endurance performance of the tire while at the same time reducing the number of layers in the crown reinforcement.

Tests have moreover shown that the tires thus produced according to the invention exhibit less deterioration and therefore offer better resistance in terms of wear due to impacts and/or rubbing against kerbs. Furthermore, the tires according to the invention appear to retain performance levels in terms of endurance, and in particular in terms of endurance in the regions of the beads, that are at least as good as those of tires with a more conventional design.

These results are all the more surprising given that the more conventional designs of this type of tire have a bead region that is relatively thick as far as the bottom of the region of the sidewall in the direction of the region of the tire in which the latter exhibits its greatest axial width, in particular so as to better absorb attacks caused by the impacts or friction suffered during contact with kerbs.

The inventors have thus been able to show that the tires produced in accordance with the invention, which have a bead region that is relatively thin in its radially outermost part, are able to resist attacks better in the event of contact with kerbs, while maintaining satisfactory properties in terms of endurance.

The inventors believe that these results can be interpreted by the fact that the profile of the outer surface of the tire between the point F and the point C, as defined above, leads to a change in said profile between the region connecting the sidewall to the bead of a tire, said region making it possible to enlarge the part of the sidewall that has a constant thickness T. According to the inventors, such a profile will lead to more uniform deformations of the tire during contact with kerbs and will make it possible to limit the risks of abrasion and/or of chunking at the outer surface of the tire. Specifically, during an impact with a kerb, the contact region of the tire is effectively the outer surface thereof and more particularly the region situated between the points F and A as defined above. The constant thickness T of the sidewall appears to allow more uniform deformation and thus a better distribution of the forces experienced in the event of an impact with or rubbing against a kerb.

The inventors have also been able to show that the profile of the outer surface of the tire according to the invention between the point F and the point C can also prevent problems of damage in the case of tires mounted in twinned pairs. Specifically, they have shown that the profile of the tire encourages the removal of stones that could become stuck between the tires before said stones cause damage in the region of the bead of the tire.

The inventors have, however, been able to demonstrate that, when running over stones of particularly large size, particularly when these come to bear against the edge of the tread of the tire, while the crown reinforcement according to the invention is beneficial to the endurance of the crown of the tire, the profile of the tire in the bead region causes significant and localized bending which, combined with said tire crown reinforcement according to the invention, encourages compression of the reinforcing elements of the carcass reinforcement.

The inventors have observed that the reinforcing elements of the carcass reinforcing layer according to the invention, which, in the test referred to as the permeability test yield a flow rate of less than 20 $cm^3$/min, because of the presence of the rubber compound within the reinforcing elements, lead to a compression behavior that allows the combination of the crown reinforcement of the tire according to the invention and the profile of the tire in the bead region.

According to an advantageous variant of the invention, the radial distance between the point F and the point A is greater than 70% of the radial distance between the point F and the radially outermost point G of the outer surface S of the tire, for which the distance, measured in a direction normal to the main part of the carcass reinforcement layer, between said main part of the carcass reinforcement layer and the surface S, is equal to T, said distance between any point, on the outer surface S of the tire, radially between the points F and G and the main part of the carcass reinforcement layer being constant.

According to this advantageous variant of the invention, the profile of the sidewall thus defined appears to provide even better uniformity of the deformation in the event of an impact with and/or rubbing against a kerb.

Advantageously according to the invention, the rupture potential index F2/FR2 of the radially outermost working layer is less than ⅙, where:

FR2 is the breaking force in uniaxial extension of each of the cords of the radially outermost working layer, $$F2 = p_2 * Tc * [(\tan(|\alpha 1|)/((\tan(|\alpha 1|) + \tan(|\alpha 2|)))/\cos^2(|\alpha 2|) + C_F], \text{ where}$$

$$Tc = 0.092 * P * Rs * (1 - (Rs^2 - R_L^2)/(2 * Rt * Rs)),$$

P is the nominal inflation pressure of the tire according to the ETRTO, $$C_F = 0.00035 * (\min((L-80)/\sin(|\alpha 1|), (L-80)/\sin(|\alpha 2|), 480) - 480),$$

$p_2$ is the pitch at which the reinforcing elements of the radially outermost working crown layer are laid, measured perpendicularly to the reinforcing elements at the circumferential median plane, $$Rs = Re - Es,$$

Re is the external radius of the tire, measured at the radially outermost point on the tread surface of the tire, said surface being extrapolated in order to fill any voids there might be, Es is the radial distance between the radially outermost point of the tire and the orthogonal projection thereof onto the radially exterior face of a reinforcing element of the radially innermost working crown layer, $R_L$ is the mean of the radii of the axially outermost points of the main part of the carcass reinforcement layer on each side of the tire, Rt is the radius of the circle passing through three points situated on the exterior surface of the tread outside of the voids, defined from a shoulder end at respective axial distances equal to ¼, ½ and ¾ of the axial width of the tread.

The thickness Es and the pitch $p_2$ are measured on a cross section of the tire, and are expressed in millimetres.

The inventors have also made the observation that the choice of the absolute value of the difference between the absolute values of the abovementioned angles α1 and α2, associated with the mean angle α and with the rupture potential index F2/FR2, as defined according to this advantageous embodiment of the invention, may make it possible to eliminate the protective layer usually installed radially on the outside of the other layers of the crown reinforcement. Such a layer is usually present so that it can be sacrificed in the event of attacks on the tire of the cut type, which could then compromise the integrity of metal reinforcing elements through corrosion phenomena associated with the fatigue of said reinforcing elements. The inventors have, effectively, observed that the reinforcing elements of the radially outermost working crown layer of a tire according to the invention are less highly stressed when the tire is inflated, or else when it is used in normal running, than the reinforcing elements of a radially outermost working crown layer of a more conventional tire; such a more conventional tire exhibits smaller differences in angle in terms of absolute value between the reinforcing elements of the different working layers, an angle made by the reinforcing elements of the radially innermost working layer that is greater than or equal to that of the reinforcing elements of the radially outermost working layer, in terms of absolute value, and a higher rupture potential index F2/FR2. The reinforcing elements of the radially outermost working crown layer of a tire according to the invention thus have endurance properties that are much better than those of a more conventional tire; the inventors have thus observed that it becomes possible to omit the protective layer, thereby contributing to the lightening of the tire.

According to one preferred embodiment of the invention, the absolute value of the difference between the absolute values of the angles α2 and α1 is greater than or equal to 11°, and preferably greater than 14°. According to this embodiment, and according to the interpretations given above, it will be possible to further improve the endurance performance of the reinforcing elements of the radially outermost working layer and/or to further improve the performance of the tire with regard to shock loadings such as those experienced when running over stony ground.

Also advantageously according to the invention, the rupture potential index F2/FR2 of the radially outermost working layer is less than ⅛. Such a rupture potential index F2/FR2 further contributes to improving the endurance performance of the reinforcing elements of the radially outermost working layer when the tire is in use.

Preferably according to the invention, the rupture potential index F1/FR1 of the radially innermost working layer is less than ⅓, where:

FR1 is the breaking force in uniaxial extension of each of the cords of the radially innermost working layer, $$F1 = p_1 * Tc * [(\tan(|\alpha 2|)/(\tan(|\alpha 1|) + \tan(|\alpha 2|)))/\cos^2(|\alpha 1|) + C_F], \text{ where}$$

$p_1$ is the pitch at which the reinforcing elements of the radially innermost working crown layer are laid, measured perpendicularly to the reinforcing elements at the circumferential median plane.

Also preferably, the rupture potential index F1/FR1 of the radially innermost working layer is at least 30% higher than the rupture potential index F2/FR2 of the radially outermost working layer.

According to one embodiment of the invention, the reinforcing elements of the working crown layers are inextensible metal cords.

According to one preferred embodiment of the invention, which optimizes the thinning of the crown of the tire, the two working crown layers are the only ones present to form the crown reinforcement over the entirety of the axial width of the crown reinforcement.

According to a preferred embodiment of the invention, the cords of the carcass reinforcement in the test referred to as the permeability test yield a flow rate of less than 10 $cm^3$/min and more preferably of less than 2 $cm^3$/min.

According to an advantageous embodiment of the invention, the metal reinforcing elements of said carcass reinforcement layer are cords, preferably non-wrapped cords, having at least two layers, at least one inner layer being sheathed with a layer consisting of a non-crosslinkable, crosslinkable or crosslinked rubber composition, preferably based on at least one diene elastomer.

The invention also proposes a tire intended to be fitted on a drop-center rim of the "15° drop-center" type, comprising a radial carcass reinforcement made up of a single carcass reinforcement layer formed of reinforcing elements, said tire comprising a crown reinforcement, comprising two working crown layers of reinforcing elements that are crossed from one layer to the other, making with the circumferential direction angles (α1, α2) of between 8° and 45°, said angles α1 and α2 being oriented on either side of the circumferential direction, the crown reinforcement being radially capped by a tread, said tread being connected to two beads via two sidewalls, the layer of reinforcing elements of the carcass reinforcement being anchored in each of the beads by being turned up around a bead wire to form a main part of the carcass reinforcement layer extending from one bead wire to the other, and a turn-up of the carcass reinforcement layer in each of the beads, said turn-up of the carcass reinforcement being reinforced by at least one layer of reinforcing elements or a stiffener, said two working crown layers being the only ones present to form the crown reinforcement over at least 75% of the axial width of the crown reinforcement, the reinforcing elements of the radially outermost working layer forming an angle α2 with the circumferential direction which is greater in terms of absolute value than the angle α1 formed by the reinforcing elements of the radially innermost working layer with the circumferential direction, the absolute value of the difference between the absolute values of the angles α2 and α1 being greater than 8°, the mean angle α satisfying the relationship:

$$13 + 131 * \exp(-L/100) < \alpha < 20 + 164 * \exp(-L/100),$$

α being defined by the relationship $\alpha = \mathrm{Arctan}((\tan(|\alpha 1|) * \tan(|\alpha 2|))^{1/2})$, L being the maximum width of the tire measured in the axial direction and expressed in mm, the metal reinforcing elements of said carcass reinforcement layer being cords, preferably non-wrapped cords, having at least two layers, at least one inner layer being sheathed with a layer consisting of a non-crosslinkable, crosslinkable or crosslinked rubber composition, preferably based on at least one diene elastomer, and, in a meridian section of said tire, any point of the profile of the outer surface S of the tire, between a first point F, itself defined by the intersection of an axially oriented straight line, passing through the axially outermost point E of the main part of the carcass reinforcement layer and the outer surface S of the tire, and a point A, is at a constant distance T from the main part of the carcass reinforcement layer, said distance being measured at any point in a direction normal to the main part of the carcass reinforcement layer, the point A is radially on the outside of a first circle C1 of radius R1 that is centered on the end of the turn-up of the carcass reinforcement layer, R1 being between 8 and 13 mm, radially on the inside of the point A, the outer surface S of the tire extends by an arc of a circle of radius R2, the center of which is axially on the outside of the surface S of the tire, the circular arc of radius R2 is tangential at its radially innermost end B to a circular arc of radius R3, the center of which is axially on the inside of the surface S of the tire, and continues the outer surface S of the tire radially inwards as far as the point C, said point C being a point of tangency between the circular arc of radius R3 and the circle C2 of radius R1 centered on the radially outermost end of the stiffener, said point C being radially on the inside of the axially outermost point D of the circle C2.

Within the meaning of the invention, metal cords that comprise at least two layers, wherein at least one inner layer is sheathed with a layer consisting of a non-crosslinkable, crosslinkable or crosslinked rubber composition, yield in what is referred to as the permeability test a flow rate that is almost nil and therefore less than 20 cm3/min.

The expression "composition based on at least one diene elastomer" means, in the known way, that the composition contains a predomination (i.e. a fraction by mass in excess of 50%) of this or these diene elastomer or elastomers.

It will be noted that the sheath according to the invention extends continuously around the layer that it covers (which means to say that this sheath is continuous in the "orthoradial" direction of the cord, which direction is perpendicular to its radius) so as to form a continuous sleeve the cross section of which is advantageously practically circular.

It will also be noted that when the rubber composition of this sheath is crosslinkable or crosslinked, it comprises, by definition, a crosslinking system adapted to allow the composition to be crosslinked in the course of its curing (i.e. allowing it to harden, not melt); thus, this rubber composition may be described as non-meltable because it cannot be melted by heating, regardless of the temperature.

Preferably, the composition of this sheath is chosen to be identical to the composition used for the rubber matrix which the cords according to the invention are intended to reinforce. Thus, there is no problem of potential incompatibility between the respective materials of the sheath and of the rubber matrix.

According to one variant of the invention, the reinforcing elements of at least one layer of the carcass reinforcement are layered metal cords of [L+M] or [L+M+N] construction comprising a first layer C1 having L threads of diameter $d_1$, with L ranging from 1 to 4, which is surrounded by at least one intermediate layer C2 having M threads of diameter $d_2$ that are wound together in a helix at a pitch $p_2$, with M ranging from 3 to 12, said layer C2 optionally being surrounded by an outer layer C3 of N threads of diameter $d_3$ that are wound together in a helix at a pitch $p_3$, with N ranging from 8 to 20, a sheath composed of a non-crosslinkable, crosslinkable or crosslinked rubber composition based on at least one diene elastomer covering said first layer C1 in the [L+M] construction and at least said layer C1 and/or at least said layer C2 in the [L+M+N] construction.

Preferably, the diameter of the threads of the first layer of the inner layer (C1) is between 0.10 and 0.5 mm and the diameter of the threads of the outer layers (C2, C3) is between 0.10 and 0.5 mm.

Also preferably, the helical pitch at which said threads of the outer layer (C3) are wound is between 8 and 25 mm.

Within the meaning of the invention, the pitch represents the length, measured parallel to the axis of the cord, at the end of which a thread having this pitch completes a full turn around the axis of the cord; thus, if the axis is sectioned by two planes perpendicular to said axis and separated by a length equal to the pitch of a thread of a layer forming the cord, the axis of this thread has, in these two planes, the same position on the two circles corresponding to the layer of the thread in question.

In general, said metal cords of at least one layer of the carcass reinforcement according to the invention can be produced using any type of metal thread, notably made of steel, for example threads made of carbon steel and/or threads of stainless steel. Use is preferably made of carbon steel but it is, of course, possible to use other steels or other alloys.

Said metal cords of at least one layer of the carcass reinforcement according to the invention can be obtained by various techniques known to a person skilled in the art, for example in two steps, initially by sheathing the layer C1 or the core or intermediate L+M structure (layers C1+C2) via an extrusion head, this step being followed, in a second step, by a final operation of cabling or twisting the M+N threads of the layers C2 and C3 around the previously-sheathed layer C1 or the N threads of the layer C3 around the previously-sheathed layer C2.

According to a preferred embodiment of the invention, the radially outermost end of the stiffener is radially on the outside of the end of the turn-up of the carcass reinforcement layer. Such an embodiment makes it possible, for the one part, to prevent the respective ends of the stiffener and of the turn-up of the carcass reinforcement layer from coinciding, said ends being radially offset. For the other part, the stiffener fully provides a function of protecting the turn-up of the carcass reinforcement layer in particular as regards contact with the rim flange and pressure applied thereto when the tire is rolling.

According to other embodiments, the radially outermost end of the stiffener is radially on the inside of the end of the turn-up of the carcass reinforcement layer.

As far as the radially innermost end of the stiffener is concerned, it can be radially on the outside of the radially innermost point of the bead wire. According to other embodiments, the stiffener may be fitted radially under the bead wire, and its radially innermost end is then radially on the inside of the bead wire. According to yet other embodiments, the stiffener can be wound around the bead wire and its radially innermost end is then axially on the inside of the carcass reinforcement layer.

According to an advantageous embodiment of the invention, in any meridian plane, in each bead, the tire has a retention reinforcement surrounding the bead wire and a volume of rubber compound in direct contact with the bead wire.

According to other alternative forms of embodiment of the invention, which offset the tire performance compromise in a way that is less favorable in terms of lightening, the crown reinforcement comprises an additional layer, referred to as a protective layer, radially on the outside of the working crown layers, preferably centered on the circumferential median plane. The reinforcing elements of such a protective layer are preferably reinforcing elements, referred to as elastic reinforcing elements, that are oriented at an angle of between 8° and 45° with respect to the circumferential direction and in the same direction as the angle formed by the reinforcing elements of the working layer that is radially adjacent thereto. Also preferably, the reinforcing elements of such a protective layer are parallel to the reinforcing elements of the working layer that is radially adjacent thereto.

Further alternative forms may also make provision for the crown reinforcement to be supplemented, between the carcass reinforcement and the radially inner working layer closest to said carcass reinforcement, by a triangulation layer made of inextensible steel metal reinforcing elements that form an angle of greater than 45° with the circumferential direction and in the same direction as that of the angle formed by the reinforcing elements of the layer that is radially closest to the carcass reinforcement. Advantageously, said triangulation layer is made up of two half-layers positioned axially on either side of the circumferential median plane.

BRIEF DESCRIPTION OF THE DRAWINGS

Further details and advantageous features of the invention will become apparent hereinafter, from the description of exemplary embodiments of the invention, in particular with reference to FIGS. 1 to 3, in which.

DETAILED DESCRIPTION OF THE DRAWINGS

In order to make them easier to understand, the figures are not shown to scale.

Figure 1:
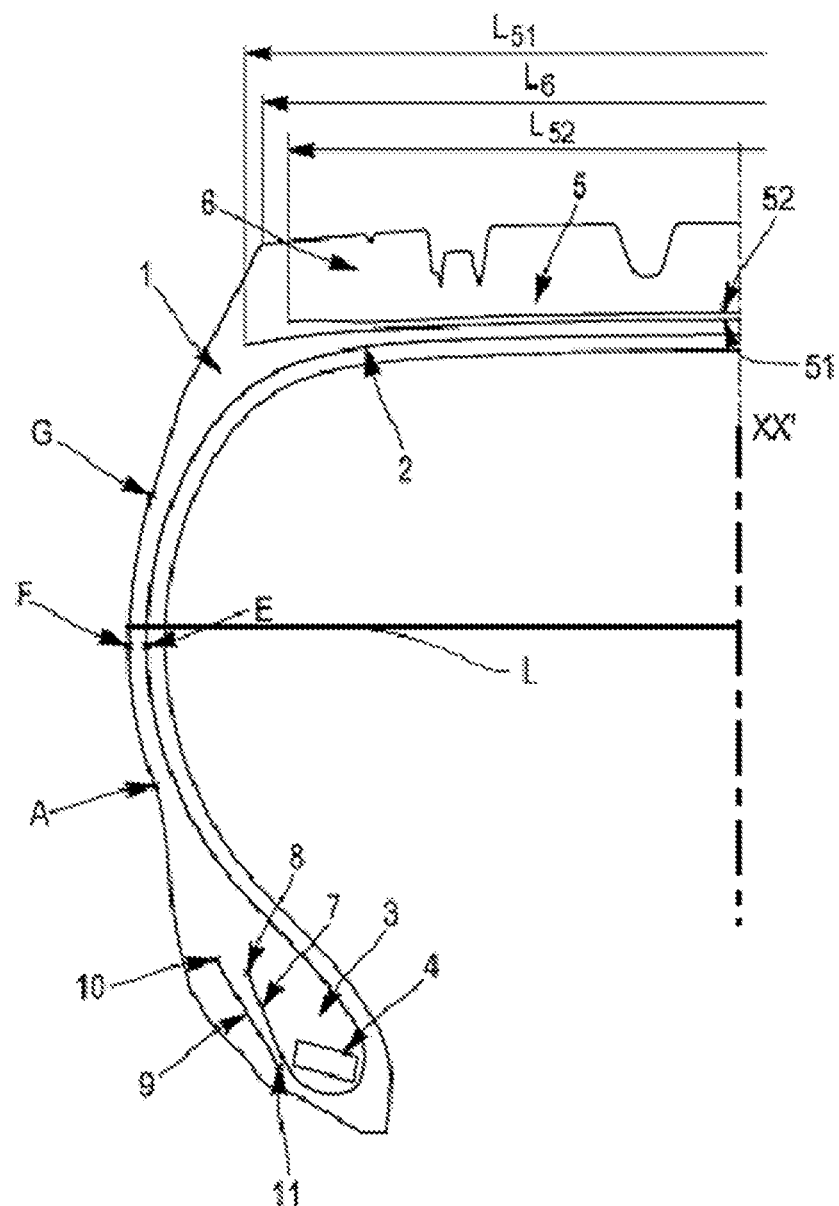
FIG. 1 shows a schematic meridian view of a tire according to the invention.
Figure 3:
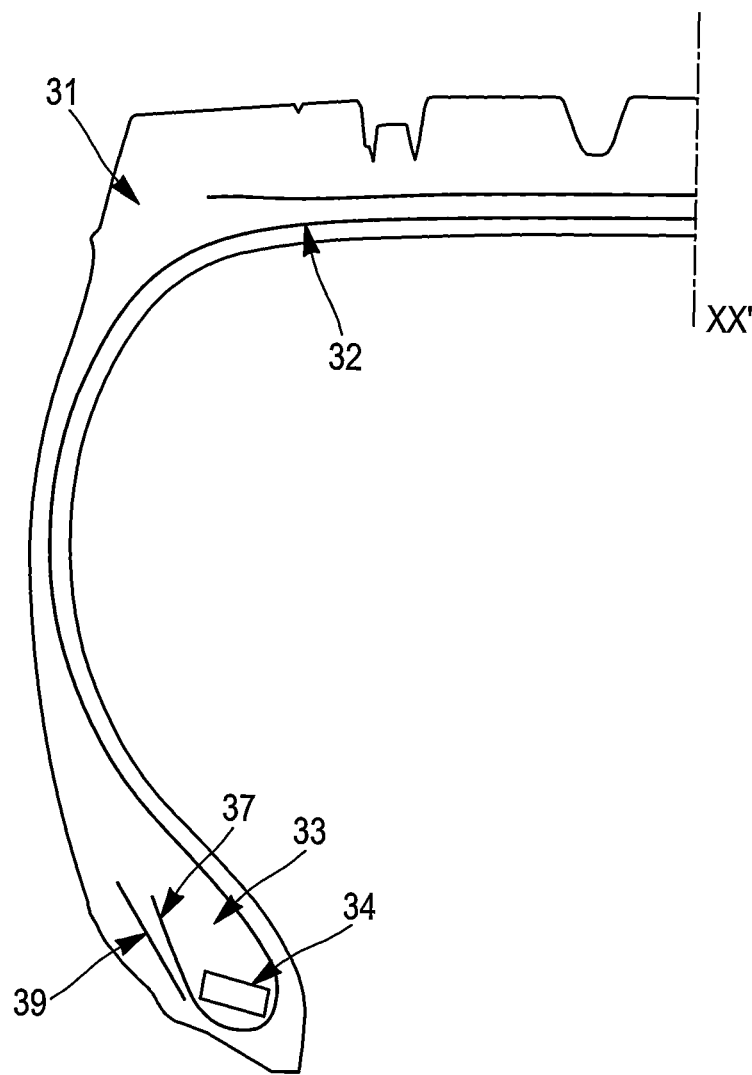
FIG. 3 shows an enlarged schematic depiction of the region of a bead of a reference tire.

FIGS. 1 and 3 show only a half-view of a tire, which extends symmetrically with respect to the axis XX', which represents the circumferential median plane, or equatorial plane, of the tire.

In FIG. 1, the tire 1 is of size 12 R 22.5. Said tire 1 comprises a radial carcass reinforcement 2 anchored in two beads 3. The carcass reinforcement 2 is formed of a single layer of metal cords. It further comprises a tread 6.

The carcass reinforcement 2, formed by a single layer of metal cords, is wound, in each of the beads 3, around a bead wire 4 and forms, in each of the beads 3, a turn-up 7 of the carcass reinforcement layer having an end 8.

Located axially on the outside of the turn-up 7 is a stiffener 9, the radially outermost end 10 of which is radially on the outside of the end 8 of the turn-up 7 of the carcass reinforcement layer.

The radially innermost end 11 of the stiffener 9 is radially on the outside of the radially innermost point of the bead wire 4.

The reinforcing elements of the carcass reinforcement layer 2 are non-wrapped layered cords of 1+6+12 structure, made up of a central nucleus formed of one thread, of an intermediate layer formed of six threads, and of an outer layer formed of twelve threads.

They exhibit the following characteristics (d and p in mm):

structure 1+6+12;
$d_1 = 0.20$ (mm);
$d_2 = 0.18$ (mm);
$p_4 = 10$ (mm)
$d_3 = 0.18$ (mm);
$p_3 = 10$ (mm);
$(d_2/d_3) = 1$;

with $d_1$ being the diameter of the nucleus thread, $d_2$ and $p_4$ respectively being the diameter and the helical pitch of the threads of the intermediate layer and $d_3$ and $p_3$ respectively being the diameter and the helical pitch of the threads of the outer layer.

The core of the cord, composed of the central nucleus formed of one thread, and of the intermediate layer formed of six threads, is sheathed with a rubber composition based on non-vulcanized diene elastomer (in the raw state). The sheathing is obtained via a head for extrusion of the core, followed by a final operation in which the 12 threads that form the outer layer are twisted or cabled around the core thus sheathed.

The cord, in the test referred to as the permeability test, as described hereinabove, yields a flow rate equal to 0 cm³/min and therefore less than 2 cm³/min. Its penetration by the rubber composition is greater than 98%.

The cord has a diameter equal to 0.95 mm.

The elastomer composition that makes up the rubber sheath is made from a composition as described hereinabove.

In FIG. 1, the carcass reinforcement 2 is hooped in accordance with the invention by a crown reinforcement 5 formed radially, from the inside to the outside:

of a first working layer 51 formed of metal cords oriented at an angle equal to 16°, of a second working layer 52 formed of metal cords oriented at an angle equal to 30° and crossed with the metal cords of the first working layer 51, the cords of each of the working layers 51, 52 being oriented on each side of the circumferential direction.

The metal cords that constitute the reinforcing elements of the two working layers are cords of formula 9.35. They are distributed within each of the working layers with a distance between the reinforcing elements, measured along the normal to the direction of the mean line of the cord, equal to 2 mm.

The tire is inflated to a pressure of 8.5 bar.

The axial width $L_{51}$ of the first working layer 51 is equal to 215 mm.

The axial width $L_{52}$ of the second working layer 52 is equal to 195 mm.

The axial width $L_6$ of the tread is equal to 210 mm.

The axial width L is equal to 302 mm.

The combined mass of the two working layers 51, 52, including the mass of the metal cords and of the skim compounds, thus amounts to 7.1 kg.

The difference between the angles formed by the cords of the first working crown layer and the circumferential direction, and those of the cords of the second working crown layer is equal to 14°.

The mean angle is equal to 22.1° and is clearly between 19.4° and 28°.

The measured value of Re is equal to 541.7 mm.

The measured value of Es is equal to 22.3 mm.

The mean value RL of the measured radii is equal to 410 mm.

The value Rt determined on the tire is equal to 900 mm.
The calculated value of Tc is equal to 362 N/mm.
The calculated value of $C_F$ is equal to −0.013.
The value of F1 is equal to 514.4 N.
The value of F2 is equal to 311.2 N.
The breaking forces of the reinforcing elements of the working crown layers FR1 and FR2 are equal to 2600 N.
The rupture potential index F2/FR2 is equal to 12%.
The rupture potential index F1/FR1 is equal to 19.8%.
The rupture potential index F1/FR1 is 65% higher than the rupture potential index F2/FR2.

Figure 2:
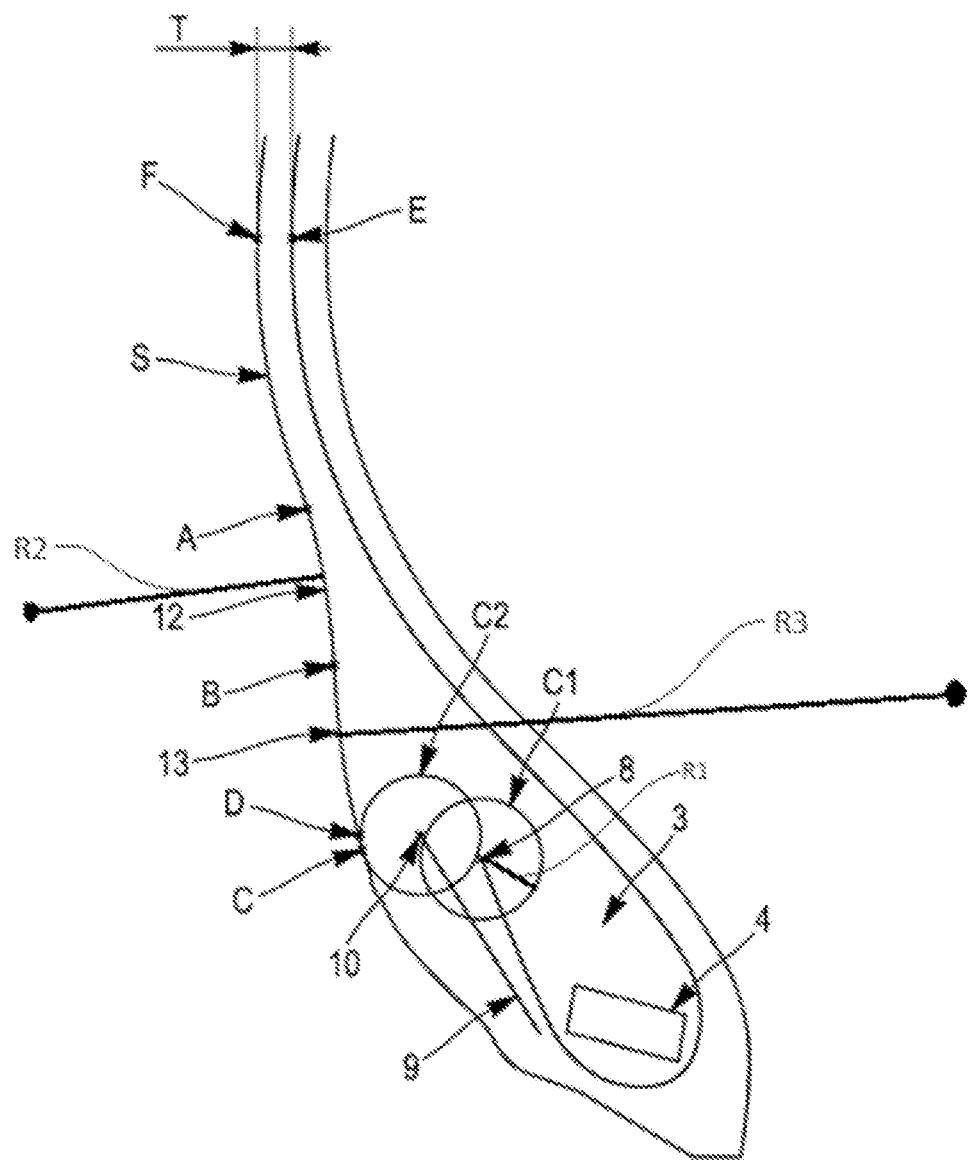
FIG. 2 shows an enlarged schematic depiction of the outer surface of the tire between the bead region and the point F.

FIG. 2 schematically illustrates the outer surface S of the tire between the point F and the region of the bead 3 in a meridian cross section of the tire, which is defined such that the centers of mass of the bead wires 4 form an axially oriented straight line, said centers of mass being distant from each other by a distance equal to the width of the nominal rim increased by 20 mm and decreased by twice the distance measured axially between a center of mass of a bead wire 4 and a point on the outer surface of the tire.

The axially outermost point E of the carcass is, for example, determined by tomography, the tire being mounted/inflated under nominal conditions.

The point F is then determined by axial projection of the point E onto the outer surface S of the tire.

The outer surface S of the tire describes a first portion, from the point F to the point A, the latter being radially on the outside of the circle C1 of radius R1 centered on the end 8 of the turn-up of the carcass reinforcement layer.

The distance T measured between any point on the outer surface S of the tire and the main part of the carcass reinforcement layer, said distance being measured at any point in a direction normal to the main part of the carcass reinforcement layer, is equal to 4.7 mm and is substantially constant over this portion between the points F and A.

The radius R1 of the circle C1 is equal to 8.3 mm.

The outer surface S of the tire then continues radially inwards through a circular arc 12 of radius R2, which is itself tangential at B to a circular arc 13 of radius R3, said circular arc continuing the outer surface S of the tire as far as the point C.

The point C is the point of tangency between the circular arc 13 and the circle C2 centered on the radially outermost end of the stiffener.

The point C is radially on the inside of the axially outermost point D of the circle C2.

The radius R2 is equal to 97 mm.
The radius R3 is equal to 121 mm.
The distance between the point F and the center of gravity of the bead wire is equal to 130 mm.

The radii R2 and R3 are thus clearly between 50% and 125% of this distance between the point F and the center of gravity of the bead wire.

The radial distance between the point F and the point A is equal to 55 mm.

The point G, which is visible in FIG. 1, is the point, radially on the outside of the point F, from which the distance between a point on the outer surface S of the tire and the main part of the carcass reinforcement layer, measured at any point in a direction normal to the main part of the carcass reinforcement layer, is greater than the distance T.

The radial distance between the point F and the point G is equal to 42 mm.

The radial distance between the point F and the point A is thus clearly greater than 70% of the radial distance between the point F and the point G.

Tires I according to the invention were compared with various reference tires of the same size.

First reference tires T1 differ from tire I according to the invention in terms of the nature of the reinforcing elements of the carcass reinforcement layer. The reinforcing elements of the carcass reinforcing layer of this first reference tire T1 are non-wrapped layered cords of 1+6+12 structure, identical to those of the tire I according to the invention, the core of these not being sheathed with a rubber composition.

Such cords, in the test referred to as the permeability test, as described hereinabove, yield a flow rate equal to 40 $cm^3$/min Their penetration by the rubber composition is equal to 66%.

Second reference tires T2 differ from the reference tires T1 in terms of their crown reinforcement, which is formed radially, from the inside to the outside:
- of a triangulation layer made up of two half-plies formed of metal cords oriented at an angle equal to 65°,
- of a first working layer formed of metal cords oriented at an angle equal to 18°, on the same side as the cords of the triangulation layer with respect to the circumferential direction,
- of a second working layer formed of metal cords oriented at an angle equal to 18° and crossed with the metal cords of the first working layer, the cords of each of the working layers being oriented on either side of the circumferential direction,
- of a protective layer formed of elastic 6.35 metal cords, in which the distance between the reinforcing elements, measured along the normal to the direction of the mean line of the cord, is equal to 2.5 mm, oriented at an angle equal to 18° on the same side as the cords of the second working layer.

The metal cords of the two working layers and of the triangulation layer are cords of formula 9.35. They are distributed within each of the working layers with a distance between the reinforcing elements, measured along the normal to the direction of the mean line of the cord, equal to 2.0 mm.

The reference tire is inflated to a pressure of 8.5 bar.
The axial width of the triangulation layer is equal to 200 mm.
The axial width of the first working layer is equal to 215 mm.
The axial width of the second working layer is equal to 195 mm.
The axial width of the protective layer is equal to 136 mm.

The combined mass of the working layers, of the protective layer and of the triangulation layer of the reference tires R2, including the mass of the metal cords and of the skim compounds, amounts to 10.4 kg.

The absolute value of the difference between the absolute values of the angles formed by the cords of the first working crown layer and the circumferential direction, and those of the cords of the second working crown layer is zero, the angles being identical, unlike in the invention.

The mean angle is equal to 18°.
The value of F1 is equal to 540 N.
The value of F2 is equal to 490 N.

The values F1 and F2 are obtained by a finite element simulation, the high number of reinforcing plies in the crown not making it possible to use a simple analytical model.

The breaking forces of the reinforcing elements of the working crown layers FR1 and FR2 are equal to 2600 N.
The rupture potential index F2/FR2 is equal to 18.9%.
The rupture potential index F1/FR1 is equal to 20.7%.

The rupture potential index F1/FR1 is 9.5% higher than the rupture potential index F2/FR2.

Third reference tires T3 differ from the tire I according to the invention in that they have a more traditional exterior surface profile, and fourth reference tires T4 differ from the reference tires T2, again in that they have a more traditional exterior surface profile. Such a tire profile is shown in FIG. 3.

In this FIG. 3, which shows a tire 31 of the same size, it appears that the region of the bead 33 is similar to that of the tire according to the invention and that the structure of the carcass reinforcement layer 32 is identical, the latter being turned-up around a bead wire 34 in order to form a turn-up 37 reinforced by a stiffener 39. By contrast, the profile of the outer surface of the tire 31 is different from that of the tire according to the invention.

Tests were carried out with tires I produced according to the invention and with the reference tires T1, T2, T3 and T4.

Endurance tests were carried out by running two shaved tires one on the other with a regulated pressure of 5.5 bar and a load of 4571 daN at a speed of 50 km/h and at an ambient temperature of 15° C. for 20 000 km.

The tests were carried out for the tires according to the invention under conditions identical to those applied to the reference tires T1, T2, T3 and T4.

All of the reference tires and the tires according to the invention exhibit substantially identical results.

Second endurance tests were run on a test machine that forced each of the tires to run in a straight line at a speed equal to the maximum speed rating prescribed for said tire (the speed index) under an initial load of 3550 daN that was progressively increased in order to reduce the duration of the test.

Other endurance tests were carried out on a test machine that cyclically imposed a transverse loading and a dynamic overload on the tires. The tests were carried out for the tires according to the invention under conditions identical to those applied to the reference tires.

The tests thus carried out showed that the distances covered during each of these tests are substantially identical for the tires according to the invention and the reference tires T1, T2, T3 and T4. It is thus apparent that the tires according to the invention and the reference tires T1 and T3 exhibit performance, in terms of endurance of the bead regions of the tire and of the crown reinforcement, which is substantially equivalent to that of the reference tires T2 and T4, when running on bituminous surfaces.

Another type of test was carried out to test the performance capabilities in terms of resistance to impacts and/or rubbing against kerbs.

In order to carry out these tests, the tires are also provided with radial striations on their sidewalls.

These tests are carried out on a pavement with a 15 cm high kerb. The tire was mounted on a vehicle, the path of which drove the tire at a speed of 20 km/h with an angle of incidence of 10° with respect to the kerb.

The operation was repeated 6 times and then the sidewall was analyzed to detect any chunking.

All of the tires exhibited two instances of chunking.

As far as the surface that struck the kerb is concerned, it is 10% less on the tire according to the invention and on the reference tires T1 and T2 compared with the reference tires T3 and T4.

Tests aimed at characterizing the breaking strength of a tire crown reinforcement subjected to shock loadings were also carried out. These tests involve running a tire, inflated to a recommended pressure and subjected to a recommended load, over a cylindrical obstacle or indenting tool with a diameter equal to 1.5 inches, i.e. 38.1 mm, with a hemispherical head, and with a given height, pressing against the center of the tread. The breaking strength is characterized by the critical height of the indenting tool, i.e. the maximum height of the indenting tool that results in complete breakage of the crown reinforcement, i.e. in the breakage of all the crown layers. The values express the energy required to obtain breakage of the crown block. The values are expressed with reference to a base 100 that corresponds to the value measured for the reference tire R4.

| Reference T4 | 100 |
| Reference T3 | 115 |
| Reference T2 | 100 |
| Reference T1 | 115 |
| Invention I | 115 |

These results show that, despite the lightening of the tire, notably by reducing the mass of the crown reinforcement thereof, the energy at break in the event of a shock loading on the surface of the tread of the tires according to the invention or of the reference tires T1 and T3 is significantly higher than that of the reference tires T4 and T2.

Final tests aimed at characterizing the breaking strength of a tire crown reinforcement subjected to specific loadings were also carried out. These tests involve running a tire, inflated to a nominal pressure according to the ETRTO, and subjected to a nominal load according to the ETRTO over 40 000 km at 40 km/h on a rolling road, over spherical obstacles of radius 26 mm, truncated at 21 mm and separated by approximately 2.50 meters, which press against the edge of the tread, the axial position of the center of the obstacles being situated 10 mm towards the center from a point beyond which the tangent to the outer surface of the tread makes an angle greater than or equal to 30° with the axial direction. Six pieces of cord of length 150 mm are extracted from the carcass reinforcement layer, the pieces being centered on the end of the axially widest working crown layer. The force at break of the cords is measured using a uniaxial tensile test, and the mean of the measurements taken across the six pieces of cord extracted from the tire is calculated. The values are expressed with reference to a base 100 that corresponds to the value measured for the reference tire T1.

| Reference T1 | 100 |
| Reference T2 | 105 |
| Reference T3 | 105 |
| Reference T4 | 100 |
| Invention I | 115 |

These results demonstrate that despite the lightening of the tire, notably by reducing the mass of the crown reinforcement thereof, the endurance performance of the cords of the carcass reinforcement layer of the tires according to the invention is significantly improved with their compression behavior having been modified in comparison with the reference tires T1, to the extent that they exhibit performance superior to that of the reference tires T2 and T4 which have more conventional crown reinforcements. Comparing the tires according to the invention against the reference tires T3, which differ only in terms of the exterior profile in the vicinity of the rim, reveals the benefit of combining carcass reinforcement cords having a sheathed core, with the bead-region exterior surface profile of the tire according to the invention.

Another tire I2 according to the invention was also tested. This tire I2 differs from tire I in terms of the nature of the reinforcing elements of the carcass reinforcement layer. The reinforcing elements of the carcass reinforcement layer of this tire I2 are non-wrapped layered cords of 1+6+11 structure, made up of a central nucleus formed of one thread, of an intermediate layer formed of six threads, and of an outer layer formed of eleven threads.

They exhibit the following characteristics (d and p in mm):

structure 1+6+11;
$d_1$=0.20 (mm);
$d_2$=0.175 (mm);
$p_4$=7 (mm)
$d_3$=0.175 (mm);
$p_3$=10 (mm);
$(d_2/d_3)$=1;

with $d_1$ being the diameter of the nucleus thread, $d_2$ and $p_4$ respectively being the diameter and the helical pitch of the threads of the intermediate layer and $d_3$ and $p_3$ respectively being the diameter and the helical pitch of the threads of the outer layer.

The core of the cord which is made up of the central nucleus formed of one thread, and of the intermediate layer formed of six threads, is not sheathed with a rubber composition.

Such cords, in the test referred to as the permeability test, as described hereinabove, yield a flow rate equal to 5 $cm^3$/min Its penetration by the rubber composition is equal to 98%.

In the tests aimed at characterizing the breaking strength of the crown reinforcement of the tire subjected to particular impacts pressing against the edge of the tread, the measured force at break of the cords, expressed with reference to a base 100 that corresponds to the value measured for the reference tire T1, is equal to 108.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire intended to be fitted on a drop-center rim of the "15° drop-center" type, comprising:
    a radial carcass reinforcement made up of a single carcass reinforcement layer formed of reinforcing elements,
    a crown reinforcement, comprising two working crown layers of reinforcing elements that are crossed from one layer to the other, making the circumferential direction angles (α1, α2) of between 8° and 45°, said angles α1 and α2 being oriented on either side of a circumferential direction,
    a tread that radially caps the crown reinforcement, said tread being connected to two beads via two sidewalls,
    the carcass reinforcement layer being anchored in each of the beads by being turned up around a bead wire to form a main part of the carcass reinforcement layer extending from one bead wire to the other, and
    a turn-up of the carcass reinforcement layer in each of the beads, said turn-up of the carcass reinforcement being reinforced by a stiffener, wherein:
    said two working crown layers are the only ones present to form the crown reinforcement over at least 75% of an axial width of the crown reinforcement,
    the reinforcing elements of the radially outermost working crown layer form the angle (α2) with the circumferential direction that is greater in terms of absolute value than the angle (α1) formed by the reinforcing elements of the radially innermost working crown layer with the circumferential direction,
    an absolute value of the difference between the absolute values of the angles (α2) and (α1) is greater than 8°,
    the mean angle α satisfies the relationship:

$13+131*\exp(-L/100)<\alpha<20+164*\exp(-L/100)$,

α being defined by the relationship $\alpha=\mathrm{Arctan}((\tan(|\alpha 1|)*\tan(|\alpha 2|))^{1/2})$, L being the maximum width of the tire measured in the axial direction and expressed in mm,
    the reinforcing elements of said carcass reinforcement layer, which are metal, are cords that, in a test referred to as a permeability test, yield a flow rate of less than 20 $cm^3$/min, and
    a rubber compound is present at least locally within the structure of said cords, in each of the beads, in a meridian section of said tire:
    any point of the profile of the outer surface (S) of the tire, between a first point (F), itself defined by the intersection of an axially oriented straight line, passing through an axially outermost point (E) of the main part of the carcass reinforcement layer and the outer surface (S) of the tire, and a point (A), is at a constant distance (T) from the main part of the carcass reinforcement layer, said distance being measured at any point in a direction normal to the main part of the carcass reinforcement layer,
    wherein the point (A) is radially on the outside of a first circle (C1) of radius (R1) that is centered on the end of the turn-up of the carcass reinforcement layer, (R1) being between 8 and 13 mm,
    radially on the inside of the point (A), the outer surface (S) of the tire extends by an arc of a circle of radius (R2), the center of which is axially on the outside of the surface (S) of the tire,
    the circular arc of radius (R2) is tangential at its radially innermost end (B) to a circular arc of radius (R3), the center of which is axially on the inside of the surface (S) of the tire, and continues the outer surface (S) of the tire radially inwards as far as a point (C), said point (C) being a point of tangency between the circular arc of radius (R3) and the circle (C2) of radius (R1) centered on the radially outermost end of the stiffener, and
    wherein said point (C) being radially on the inside of the axially outermost point (D) of the circle (C2).

2. A tire intended to be fitted on a drop-center rim of the "15° drop-center" type, comprising a radial carcass reinforcement made up of a single carcass reinforcement layer formed of reinforcing elements, said tire comprising a crown reinforcement, comprising two working crown layers of reinforcing elements that are crossed from one layer to the other, making the circumferential direction angles (α1, α2) of between 8° and 45°, said angles α1 and α2 being oriented on either side of the circumferential direction, the crown reinforcement being radially capped by a tread, said tread being connected to two beads via two sidewalls, the layer of reinforcing elements of the carcass reinforcement being anchored in each of the beads by being turned up around a bead wire to form a main part of the carcass reinforcement layer extending from one bead wire to the other, and a turn-up of the carcass reinforcement layer in each of the beads, said turn-up of the carcass reinforcement being reinforced by a stiffener, wherein:

said two working crown layers are the only ones present to form the crown reinforcement over at least 75% of the axial width of the crown reinforcement, the reinforcing elements of the radially outermost working crown layer form an angle ($\alpha 2$) with the circumferential direction that is greater in terms of absolute value than the angle ($\alpha 1$) formed by the reinforcing elements of the radially innermost working crown layer with the circumferential direction, an absolute value of the difference between the absolute values of the angles ($\alpha 2$) and ($\alpha 1$) is greater than 8°, the mean angle $\alpha$ satisfies the relationship:

$$13+131*\exp(-L/100)<\alpha<20+164*\exp(-L/100),$$

$\alpha$ being defined by the relationship $\alpha=\mathrm{Arctan}((\tan(|\alpha 1|)*\tan(|\alpha 2|))^{1/2})$, L being the maximum width of the tire measured in the axial direction and expressed in mm, the reinforcing elements of said carcass reinforcement layer being cords, preferably non-wrapped cords, having at least two layers, at least one inner layer being sheathed with a layer consisting of a non-crosslinkable, crosslinkable or crosslinked rubber composition, preferably based on at least one diene elastomer,, in each of the beads, in a meridian section of said tire:

any point of the profile of the outer surface(S) of the tire, between a first point (F), itself defined by the intersection of an axially oriented straight line, passing through an axially outermost point (E) of the main part of the carcass reinforcement layer and the outer surface (S) of the tire, and a point (A), is at a constant distance (T) from the main part of the carcass reinforcement layer, said distance being measured at any point in a direction normal to the main part of the carcass reinforcement layer, the point (A) is radially on the outside of a first circle (C1) of radius (R1) that is centered on an end of the turn-up of the carcass reinforcement layer, (R1) being between 8 and 13 mm, radially on the inside of the point (A), the outer surface(S) of the tire extends by an arc of a circle of radius (R2), the center of which is axially on the outside of the surface(S) of the tire, the circular arc of radius (R2) is tangential at its radially innermost end (B) to a circular arc of radius (R3), the center of which is axially on the inside of the surface(S) of the tire, and continues the outer surface(S) of the tire radially inwards as far as a point (C), said point (C) being a point of tangency between the circular arc of radius (R3) and the circle (C2) of radius (R1) centered on a radially outermost end of the stiffener, and wherein said point (C) being radially on the inside of an axially outermost point (D) of the circle (C2).

3. The tire according to claim 1, wherein a rupture potential index F2/FR2 of the radially outermost working crown layer is less than 1/6, where:

FR2 is a breaking force in uniaxial extension of each of the cords of the radially outermost working crown layer, $$F2=p_2*Tc*[(\tan(|\alpha 1|)/((\tan(|\alpha 1|)+\tan(|\alpha 2|)))/\cos^2(|\alpha 2|)+C_F], \text{ where}$$

$$Tc=0.092*P*Rs*(1-(Rs^2-RL^2)/(2*Rt*Rs)),$$

P is the nominal inflation pressure of the tire according to the ETRTO, $$C_F=0.00035*(\min((L-80)/\sin(|\alpha 1|),(L-80)/\sin(|\alpha 2|),480)-480),$$

$p_2$ is the pitch at which the reinforcing elements of the radially outermost working crown layer are laid, measured perpendicularly to the reinforcing elements at the circumferential median plane, $$Rs=Re-Es,$$

Re is an external radius of the tire, measured at the radially outermost point on the tread surface of the tire, said surface being extrapolated in order to fill any voids there might be, Es is a radial distance between the radially outermost point of the tire and an orthogonal projection thereof onto a radially exterior face of at least one of the reinforcing element of the radially innermost working crown layer, RL is a mean of the radii of axially outermost points on each side of the tire, and Rt is a radius of the circle passing through three points situated on the exterior surface of the tread outside of the any voids there might be, defined from a shoulder end at respective axial distances equal to ¼, ½ and ¾ of the width of the tread.

4. The tire according to claim 1, wherein a rupture potential index F2/FR2 of the radially outermost working layer is less than 1/8, where FR2 is a breaking force in uniaxial extension of each of the cords of the radially outermost working layer, $$F2=p_2*Tc*[(\tan(|\alpha 1|)/((\tan(|\alpha 1|)+\tan(|\alpha 2|)))/\cos^2(|\alpha 2|)+C_F], \text{ where}$$

$$Tc=0.092*P*Rs*(1-(Rs^2-RL^2)/(2*Rt*Rs)),$$

P is the nominal inflation pressure of the tire according to the ETRTO, $$C_F=0.00035*(\min((L-80)/\sin(|\alpha 1|),(L-80)/\sin(|\alpha 2|),480)-480),$$

$p_2$ is the pitch at which the reinforcing elements of the radially outermost working crown layer are laid, measured perpendicularly to the reinforcing elements at the circumferential median plane, $$Rs=Re-Es,$$

Re is an external radius of the tire, measured at the radially outermost point on the tread surface of the tire, said surface being extrapolated in order to fill any voids there might be, Es is a radial distance between the radially outermost point of the tire and an orthogonal projection thereof onto a radially exterior face of at least one of the reinforcing element of the radially innermost working crown layer, RL is a mean of the radii of axially outermost points on each side of the tire, and Rt is a radius of the circle passing through three points situated on the exterior surface of the tread outside of the any voids there might be, defined from a shoulder end at respective axial distances equal to ¼, ½ and ¾ of the width of the tread.

5. The tire according to claim 1, wherein the rupture potential index F1/FR1 of the radially innermost working crown layer is less than 1/3, where:

FR1 is a breaking force in uniaxial extension of each of the cords of the radially innermost working crown layer, $$F1=p_1*Tc*[(\tan(|\alpha 2|)/((\tan(|\alpha 1|)+\tan(|\alpha 2|)))/\cos^2(|\alpha 1|)+C_F], \text{ where}$$

p₁ is a pitch at which the reinforcing elements of the radially innermost working crown layer are laid, measured perpendicularly to the reinforcing elements at the circumferential median plane, $Tc=0.092*P*Rs*(1-(Rs^2-RL^2)/(2*Rt*Rs))$, P is the nominal inflation pressure of the tire according to the ETRTO, $C_F=0.00035*(\min((L-80)/\sin(|\alpha 1|),(L-80)/\sin(|\alpha 2|), 480)-480)$, $Rs=Re-Es$, Re is an external radius of the tire, measured at the radially outermost point on the tread surface of the tire, said surface being extrapolated in order to fill any voids there might be, Es is a radial distance between the radially outermost point of the tire and an orthogonal projection thereof onto a radially exterior face of at least one of the reinforcing element of the radially innermost working crown layer, RL is a mean of radii of axially outermost points on each side of the tire, and Rt is a radius of the circle passing through three points situated on the exterior surface of the tread outside of the any voids there might be, defined from a shoulder end at respective axial distances equal to ¼, ½ and ¾ of the width of the tread.

6. The tire according to claim 5, wherein the rupture potential index F1/FR1 of the radially innermost working layer is at least 30% higher than the rupture potential index F2/FR2 of the radially outermost working layer, where:

FR1 is a breaking force in uniaxial extension of each of the cords of the radially innermost working layer, and FR2 is a breaking force in uniaxial extension of each of the cords of the radially outermost working layer, $F2=p_2*Tc*[(\tan(|\alpha 1|)/((\tan(|\alpha 1|)+\tan(|\alpha 2|)))/\cos^2(|\alpha 2|)+C_F]$, where $Tc=0.092*P*Rs*(1-(Rs^2-RL^2)/(2*Rt*Rs))$, P is the nominal inflation pressure of the tire according to the ETRTO, $C_F=0.00035*(\min((L-80)/\sin(|\alpha 1|),(L-80)/\sin(|\alpha 2|), 480)-480)$, p₂ is a pitch at which the reinforcing elements of the radially outermost working crown layer are laid, measured perpendicularly to the reinforcing elements at a circumferential median plane, $Rs=Re-Es$, Re is an external radius of the tire, measured at the radially outermost point on the tread surface of the tire, said surface being extrapolated in order to fill any voids there might be, Es is a radial distance between the radially outermost point of the tire and an orthogonal projection thereof onto a radially exterior face of at least one of the reinforcing element of the radially innermost working crown layer, RL is a mean of the radii of axially outermost points on each side of the tire, and Rt is a radius of the circle passing through three points situated on the exterior surface of the tread outside of the any voids there might be, defined from a shoulder end at respective axial distances equal to ¼, ½ and ¾ of the width of the tread.

7. The tire according to claim 1, wherein the two working crown layers are the only ones present to form the crown reinforcement over the entirety of the axial width of the crown reinforcement.

8. The tire according to claim 1, wherein the radius (R2) is between 50% and 125% of the distance between the point (F) and a center of gravity of the bead wire.

9. The tire according to claim 1, wherein the radius (R3) being between 50% and 125% of the distance between the point (F) and a center of gravity of the bead wire.

10. The tire according to claim 1, wherein the distance (T), measured in the direction normal to the main part of the carcass reinforcement layer, is greater than 3 mm and preferably less than 7 mm.

11. The tire according to claim 1, wherein the radial distance between the point (F) and the point (A) is greater than 70% of the radial distance between the point (F) and a radially outermost point (G) of the outer surface(S) of the tire, for which the distance, measured in a direction normal to the main part of the carcass reinforcement layer, between said main part of the carcass reinforcement layer and the surface(S), is equal to (T), said distance between any point, on the outer surface(S) of the tire, radially between the points (F) and (G) and the main part of the carcass reinforcement layer being constant.

12. The tire according to claim 1, wherein the radially outermost end of the stiffener is radially on the outside of the end of the turn-up of the carcass reinforcement layer.

13. The tire according to claim 1, wherein in any meridian plane, in each bead, the tire has a retention reinforcement surrounding the bead wire and a volume of rubber compound in direct contact with the bead wire.

14. The tire according to claim 2, wherein the rupture potential index F2/FR2 of the radially outermost working crown layer is less than ⅙, where:

FR2 is the breaking force in uniaxial extension of each of the cords of the radially outermost working crown layer, $F2=p_2*Tc*[(\tan(|\alpha 1|)/((\tan(|\alpha 1|)+\tan(|\alpha 2|)))/\cos^2(|\alpha 2|)+C_F]$, where $Tc=0.092*P*Rs*(1-(Rs^2-RL^2)/(2*Rt*Rs))$, P is the nominal inflation pressure of the tire according to the ETRTO, $C_F=0.00035*(\min((L-80)/\sin(|\alpha 1|),(L-80)/\sin(|\alpha 2|), 480)-480)$, p₂ is the pitch at which the reinforcing elements of the radially outermost working crown layer are laid, measured perpendicularly to the reinforcing elements at the circumferential median plane, $Rs=Re-Es$, Re is the external radius of the tire, measured at the radially outermost point on the tread surface of the tire, said surface being extrapolated in order to fill any voids there might be, Es is the radial distance between the radially outermost point of the tire and the orthogonal projection thereof onto the radially exterior face of a reinforcing element of the radially innermost working crown layer, RL is the mean of the radii of the axially outermost points on each side of the tire, and Rt is the radius of the circle passing through three points situated on the exterior surface of the tread outside of the voids, defined from a shoulder end at respective axial distances equal to ¼, ½ and ¾ of the width of the tread.

\* \* \* \* \*